(12) United States Patent
Livi

(10) Patent No.: US 11,034,833 B2
(45) Date of Patent: Jun. 15, 2021

(54) EPOXY/REINFORCING POLYMER COMPOSITE MATERIAL AND ITS METHOD OF PREPARATION

(71) Applicants: UNIVERSITE CLAUDE BERNARD LYON 1, Villeurbanne (FR); UNIVERSITÉ JEAN MONNET SAINT ETIENNE (UJM), Saint Etienne (FR); CENTRE NATIONAL DE LA RECHERCHE SCIENTIFIQUE, Paris (FR); INSTITUT NATIONAL DES SCIENCES APPLIQUÉES DE LYON, Villeurbanne (FR)

(72) Inventor: Sébastien Livi, Villeurbanne (FR)

(73) Assignees: UNIVERSITE CLAUDE BERNARD LYON 1, Villeurbanne (FR); UNIVERSITÉ JEAN MONNET SAINT ETIENNE, Saint Etienne (FR); CENTRE NATIONAL DE LA RECHERCHE SCIENTIFIQUE, Paris (FR); INSTITUT NATIONAL DES SCIENCES APPLIQUEES DE LYON, Villeurbanne (FR)

( * ) Notice: Subject to any disclaimer, the term of this patent is extended or adjusted under 35 U.S.C. 154(b) by 9 days.

(21) Appl. No.: 16/303,160

(22) PCT Filed: May 22, 2017

(86) PCT No.: PCT/EP2017/062273
§ 371 (c)(1),
(2) Date: Nov. 20, 2018

(87) PCT Pub. No.: WO2017/202771
PCT Pub. Date: Nov. 30, 2017

(65) Prior Publication Data
US 2019/0169423 A1 Jun. 6, 2019

(30) Foreign Application Priority Data

May 24, 2016 (FR) .................................. 1654647
Jul. 29, 2016 (FR) .................................. 1657349

(51) Int. Cl.
| | |
|---|---|
| *C08G 59/40* | (2006.01) |
| *C08G 59/68* | (2006.01) |
| *C08L 63/00* | (2006.01) |
| *C08K 5/50* | (2006.01) |
| *C08L 53/00* | (2006.01) |
| *C08J 3/20* | (2006.01) |
| *C09D 7/62* | (2018.01) |
| *B29C 39/00* | (2006.01) |
| *B29C 39/02* | (2006.01) |
| *B29C 39/38* | (2006.01) |
| *C09D 163/00* | (2006.01) |

(Continued)

(52) U.S. Cl.
CPC ............ *C08L 63/00* (2013.01); *B29C 39/003* (2013.01); *B29C 39/02* (2013.01); *B29C 39/38* (2013.01); *C08G 59/40* (2013.01); *C08J 3/20* (2013.01); *C08K 5/50* (2013.01); *C08L 53/00* (2013.01); *C09D 7/62* (2018.01); *C09D 163/00* (2013.01); *B29K 2063/00* (2013.01); *B29K 2471/12* (2013.01); *B29K 2883/00* (2013.01); *B29K 2995/0016* (2013.01); *B29K 2995/0017* (2013.01); *B29K 2995/0069* (2013.01); *B29K 2995/0089* (2013.01); *C08L 2201/56* (2013.01); *C08L 2205/03* (2013.01); *C08L 2207/53* (2013.01); *C08L 2312/00* (2013.01)

(58) Field of Classification Search
None
See application file for complete search history.

(56) References Cited

U.S. PATENT DOCUMENTS

| | | | | |
|---|---|---|---|---|
| 3,784,583 A * | 1/1974 | Smith | ....................... | H01B 3/40 523/440 |
| 4,076,626 A * | 2/1978 | Meier | ..................... | B01D 69/10 210/496 |

(Continued)

FOREIGN PATENT DOCUMENTS

| | | | | |
|---|---|---|---|---|
| EP | 1176171 A2 * | 1/2002 | .............. | C08L 63/00 |
| WO | WO 2010/084939 | 7/2010 | | |

(Continued)

OTHER PUBLICATIONS

Silva, A. A. et al. "New epoxy systems based on ionic liquid" *Polymer*, Feb. 16, 2013, pp. 2123-2129, vol. 54.

(Continued)

*Primary Examiner* — Michael J Feely
(74) *Attorney, Agent, or Firm* — Saliwanchik, Lloyd & Eisenschenk

(57) ABSTRACT

The present invention relates to the technical field of composite materials comprising a thermosetting polymer matrix in which thermoplastic polymer and/or elastomer particles are dispersed. More precisely, the invention relates to a novel type of polymeric material obtained by using a particular ionic liquid as cross-linking agent for an epoxy resin mixed with a thermoplastic polymer and/or an elastomer.

The invention also relates to a process for manufacturing said composite material and uses thereof, notably in the aeronautical, aerospace, automotive, maritime, wind power, electronics, or sports and leisure sectors.

14 Claims, No Drawings

(51) Int. Cl.
*B29K 63/00* (2006.01)
*B29K 471/00* (2006.01)

(56) References Cited

U.S. PATENT DOCUMENTS

| | | | | |
|---|---|---|---|---|
| 4,617,345 | A * | 10/1986 | Sederel | C08L 69/00 525/146 |
| 5,276,106 | A * | 1/1994 | Portelli | C08J 5/24 525/423 |
| 2009/0118442 | A1 * | 5/2009 | Tsunashima | C08G 59/688 525/523 |
| 2010/0280151 | A1 | 11/2010 | Nguyen et al. | |
| 2010/0319964 | A1 * | 12/2010 | Ootake | H01B 3/40 174/137 B |
| 2012/0296012 | A1 * | 11/2012 | Palmese | C08G 59/184 523/427 |
| 2014/0057515 | A1 * | 2/2014 | Suzuki | C08J 5/24 442/65 |
| 2015/0252184 | A1 | 9/2015 | Arai et al. | |
| 2016/0176083 | A1 * | 6/2016 | Meegan | B29C 45/7207 523/467 |
| 2016/0244590 | A1 | 8/2016 | Takada | |
| 2016/0251493 | A1 | 9/2016 | Takada | |

FOREIGN PATENT DOCUMENTS

| | | |
|---|---|---|
| WO | WO 2015/068786 | 5/2015 |
| WO | WO 2015/068787 | 5/2015 |

OTHER PUBLICATIONS

Hodgkin, J. H. et al. "Thermoplastic Toughening of Epoxy Resins: a Critical Review" *Polymers for Advanced Technologies*, Jan. 1, 1998, pp. 3-10, vol. 9.

Kowalczyk, K. et al. "Ionic liquids as convenient latent hardeners of epoxy resins" *Polimery*, 2003, p. 1, Abstract Only.

Written Opinion in International Application No. PCT/EP2017/062273, dated Jul. 7, 2017, pp. 1-10.

* cited by examiner

EPOXY/REINFORCING POLYMER COMPOSITE MATERIAL AND ITS METHOD OF PREPARATION

CROSS-REFERENCE TO RELATED APPLICATION

This application is the U.S. national stage application of International Patent Application No. PCT/EP2017/062273, filed May 22, 2017.

FIELD OF THE INVENTION

The present invention relates to the technical field of composite materials comprising a thermosetting polymer matrix in which thermoplastic polymer and/or elastomer particles are dispersed. More precisely, the invention relates to a novel type of polymeric material obtained by using a particular ionic liquid as cross-linking agent for an epoxy resin mixed with a thermoplastic polymer and/or an elastomer.

The invention also relates to a process for manufacturing said composite material and uses thereof, notably in the aeronautics, aerospace, automotive, maritime, wind power, electronics, or sports and leisure sectors.

PRIOR ART

Thermosetting materials have a three-dimensional structure formed by chemical bonds resulting from a polymerization reaction between a thermosetting resin, usually an epoxy resin, and a hardener, which may be an amine, an acid anhydride, a phenol or an isocyanate. Under the effect of heat, i.e. by "curing", the reaction of the resin with the hardener causes a phenomenon of gelation then of vitrification, leading to a thermoset material that is infusible and insoluble. Their mechanical properties and their thermal and chemical resistance have made thermosetting resins suitable for many applications, notably in the aeronautics and automotive industries.

A disadvantage of thermosetting resins, however, is their poor impact resistance, which makes them brittle, and their low fracture toughness, which facilitates the propagation of cracks within the material. To overcome this disadvantage, it has already been contemplated to prepare two-component thermosetting/thermoplastic systems. To that end, the simplest solution consists in adding an initially-miscible thermoplastic polymer into the thermosetting resin, which thus serves as its solvent. Polymerization of the resin generates a decrease in entropy which leads to a phase separation to form either a dispersion of spherical nodules of thermoplastic polymer in the thermoset matrix, or co-continuous structures. This makes it possible to obtain high-performance composites with both high rigidity and high toughness.

Composites of this type are notably described in Thermoplastic toughening of epoxy resins: A Critical Review, *Polymers for Advanced Technologies*, 9(1)3-10 (1998) and Development and characterization of thermosetting-thermoplastic polymer blends for applications in damage tolerant composites, *Polymer Physics*, 26(1) 65-81 (1988) and have since been developed. They are obtained by mixing a thermoplastic polymer with an epoxy prepolymer in the presence of a cross-linking agent of the amine type (aliphatic or aromatic polyamine).

Another solution for improving the fracture toughness of epoxy resin materials consists in adding to the resin an elastomer, which may notably be in the form of core-shell particles (A. Maazouz et al., Polymer Bulletin 33: 67-74 (1994)), possibly formed in situ (US 2010/280151, US 2015/252184).

It turns out that, for the cross-linking of the epoxy resin to be effective, a stoichiometric amount (which is large) of cross-linking agent must be used. However, some of these cross-linking agents, in particular aromatic diamines, have been found to be toxic to humans and the environment. Therefore, their use must be limited, notably to comply with the REACH regulation.

In addition, these cross-linking agents do not always lead to materials whose thermal stability, water and/or solvent barrier properties, and fracture toughness are sufficient for certain applications.

The problem that the invention proposes to solve is therefore that of developing epoxy/reinforcing polymer composite materials having better properties than those obtained using conventional cross-linking agents and which are not dangerous for humans and the environment.

Ionic liquids are mixtures consisting solely of ions, respectively an organic cation and an anion which may be organic or inorganic, forming a salt which has a melting temperature below 100° C. and generally below 25° C. Because they are non-volatile, they are considered less harmful to the environment than conventional organic solvents and have therefore been used as organic reaction solvents since the 1980s.

It has already been proposed to use ionic liquids as curing agents for epoxy resins, possibly mixed with thermoplastic polymers, for the manufacture of materials used in the manufacture of electroluminescent display devices (WO 2010/084939, WO 2015/068786, WO 2015/068787). However, these materials have insufficient barrier properties, which require the addition of metal oxides to absorb the moisture they contain.

It has also been suggested to use a tetraalkylphosphonium dialkylphosphinate ionic liquid as curing agent for DGEBA epoxy prepolymers (Livi et al., *Polymer* 54 (2013) 2123-2129). In this case, the ionic liquid acts as a catalyst for the homopolymerization of DGEBA at room temperature. It produces a material with a higher thermal stability than that obtained using a diamine-type cross-linking agent with a polyether backbone.

SUMMARY OF THE INVENTION

Surprisingly, the Applicant demonstrated that certain ionic liquids could be used as cross-linking agents for epoxy resins mixed with reinforcing polymers (thermoplastic polymers and/or elastomers) to improve the properties, and in particular the thermal stability, fracture toughness, and barrier and fire-retardant properties, of the composite material obtained, compared with conventional cross-linking agents. These ionic liquids also have the advantage of acting as both cross-linking agent for the epoxy resin and solubilizer for the thermoplastic polymer, when present. They thus make it possible to prepare composites without using organic solvents. They also constitute a class of low-volatile, non-flammable "green" compounds, which prove to be effective as cross-linking agents in lower proportions than conventional cross-linkers. For all these reasons, the use of ionic liquids is an undeniable advantage in terms of the environmental impact of the process in which they are used.

The invention thus relates to a composite material comprising a dispersion of thermoplastic polymer and/or elastomer particles in an epoxy matrix cross-linked by at least one ionic liquid which consists of a dialkylphosphate or dialkylphosphinate salt of an organic cation, wherein the alkyl group is linear or branched and independently contains from 1 to 12 carbon atoms.

It also relates to the use of this material for the manufacture of parts or coatings useful in the aeronautics, aerospace, automotive, maritime, wind power, electronics, or sports and leisure sectors, as well as to a process for manufacturing this composite material comprising the following steps:

a) mixing (i) at least one thermoplastic polymer, at least one elastomer or one thermoplastic polymer associated with an elastomer, (ii) an epoxy resin and (iii) a cross-linking agent comprising, preferably consisting of, at least one ionic liquid consisting of a dialkylphosphate or dialkylphosphinate salt of an organic cation, wherein the alkyl group is linear or branched and independently contains from 1 to 12 carbon atoms;

(b) shaping and curing the mixture thus obtained.

DETAILED DESCRIPTION

The composite material according to the invention comprises an epoxy matrix cross-linked by an ionic liquid, within which is dispersed the thermoplastic polymer, the elastomer or the thermoplastic polymer associated with the elastomer, referred to below interchangeably as "reinforcing polymer".

In a first embodiment of the invention, the composite material contains thermoplastic polymer particles.

In a second embodiment of the invention, the composite material includes elastomer nanoparticles.

In a third embodiment, the composite material contains particles with a core-shell structure. In a preferred embodiment of the invention, these particles are such that the core comprises or consists of an elastomer and the shell comprises or consists of a thermoplastic polymer. Alternatively, however, multilayer core-shell particles may be used in the present invention, the core of which comprises or consists of a thermoplastic polymer which is covered with an intermediate layer comprising or consisting of an elastomer, itself covered with a shell comprising or consisting of a thermoplastic polymer. In these embodiments, the material is considered to contain a thermoplastic polymer associated with an elastomer.

The material according to these three embodiments can be obtained according to a process comprising the following steps:

a) mixing: (i) at least one thermoplastic polymer, at least one elastomer or one thermoplastic polymer associated with an elastomer, (ii) an epoxy resin and (iii) a cross-linking agent comprising, preferably consisting of, at least one ionic liquid which consists of a dialkylphosphate or dialkylphosphinate salt of an organic cation, wherein the alkyl group is linear or branched and independently contains from 1 to 12 carbon atoms;

(b) shaping and curing the mixture thus obtained.

Alternatively, the material according to the third embodiment above can be obtained by a process comprising the following steps:

a) mixing: (i) an epoxy resin, (ii) a block copolymer capable of forming a core-shell structure after solubilization in the epoxy resin and (iii) a crosslinking agent for the epoxy resin comprising, preferably consisting of, at least one ionic liquid which consists of a dialkylphosphate or dialkylphosphinate salt of an organic cation, wherein the alkyl group is linear or branched and independently contains from 1 to 12 carbon atoms;

b) shaping and curing the mixture thus obtained.

The above processes are advantageously carried out in the absence of organic solvent.

Examples of block copolymers include an A-B-A triblock copolymer of which the B block is an elastomeric polymer, such as poly(butyl acrylate) or a polysiloxane, and the A blocks are thermoplastic polymers, such as poly(methyl methacrylate), a polyether or polycaprolactone. Examples of such block copolymers are notably marketed by ARKEMA under the brand name Nanostrength®. These block copolymers make it possible to obtain in situ particles with an average diameter comprised between 10 and 100 nm, for example between 20 and 70 nm. They can be used in a proportion of 3 to 10% by weight, based on the weight of epoxy resin, for example.

In the context of the present description, "epoxy resin" means at least one epoxy monomer and/or at least one epoxy prepolymer. "Epoxy prepolymer" means an oligomer or polymer comprising at least two terminal epoxy functions, generally obtained by reacting epichlorohydrin with a polyhydroxy compound and which, by cross-linking, becomes infusible and insoluble to form a thermoset resin referred to here as "epoxy matrix".

Advantageously, the epoxy resin has at least two and at most four epoxide functions.

In a particular embodiment, the epoxy resin is an epoxy prepolymer which is advantageously selected from the group consisting of DGEBA (diglycidyl ether of bisphenol A), DGEBF (diglycidyl ether of 9,9-bis(4-hydroxyphenyl) fluorene), DGEFX (diglycidyl ether of 3,6-dihydroxyspiro-[fluorene-9,9'-xanthane]), DGEA (diglycidyl ether of 10,10-bis(4-hydroxyphenyl)anthrone) and TGETA (diglycidyl ether of 9,9,10,10-tetrakis(4-hydroxyphenyl)anthracene) resins. It is preferred to use a DGEBA resin as epoxy resin.

The thermoplastic polymer can be selected from amorphous or semi-crystalline thermoplastic polymers. Examples of such polymers can notably be selected from the group consisting of poly(ether sulfones), polyethylenimines, polyamides, polyamide-imides, poly(phenylene oxides) optionally grafted with methacrylate (PPO-g-MA), and mixtures thereof. Polyphenylene oxides are preferred for use in the present invention.

The amount of thermoplastic polymer used can range from 0.5 to 60 parts by weight per hundred parts by weight of epoxy resin.

The elastomer can be selected from polysiloxanes, poly (butyl acrylate), poly(styrene-co-butadiene), poly(butadiene-co-acrylonitrile), nitrile rubber and generally all non-reactive elastomers. To facilitate its solubilization in the epoxy resin, it is possible to add a solvent to the mixture or to first dissolve the epoxy resin in a solvent. In the case where a butadiene-acrylonitrile copolymer is used, it is also possible to increase the acrylonitrile/butadiene ratio and/or the molar mass of the epoxy resin to improve the solubilization of the elastomer in the epoxy resin.

However, according to the present invention, it is preferred that the elastomer is in the form of nanoparticles or is included in core-shell particles.

In the first case, the use of nanoparticles significantly increases the interfacial tension between the elastomer particles and the epoxy resin. These nanoparticles are advantageously used in the form of colloidal suspension in a suitable solvent. They can have a diameter ranging from 20 to 100 nm, for example. Elastomer nanoparticles may represent from 0.5 to 60%, and in particular from 5 to 20%, of the weight of the epoxy resin, for example.

In the case where a core-shell structure is used, the core of this structure comprises or consists of an elastomer which may be selected from those mentioned above and the shell comprises or consists of a thermoplastic polymer which may also be selected from those mentioned above. These particles may therefore consist, for example, of a polysiloxane core and a poly(alkyl methacrylate), notably poly(methyl methacrylate), or polystyrene shell. Examples of such core-shell particles are notably marketed by WACKER under the brand name Genioperl®. These particles can notably be prepared by emulsion polymerization. They may have a particle size comprised between 5 nm and 100 μm, preferably between 10 nm and 10 μm, and more preferentially between 50 and 500 nm, for example between 100 and 300 nm.

The use of an elastomer in the form of such core-shell particles does not significantly affect the glass transition temperature of the composite material and results in a well-defined particle size and a volume fraction of elastomer that is homogeneously dispersed within the epoxy matrix.

To improve the structural stability of these particles when mixed with the epoxy resin, the core and/or the shell, preferably the shell, core-shell particles can be cross-linked, for example with divinylbenzene. To that end, the monomer constituting the shell, for example methyl methacrylate, can be copolymerized with at least one cross-linkable monomer such as ethylene glycol dimethacrylate, glycidyl methacrylate, methacrylic acid and/or acrylonitrile.

Core-shell particles can represent from 1 to 15% by weight, notably from 2 to 12% by weight, based on the weight of epoxy resin, for example.

As mentioned above, a particular ionic liquid is used as cross-linking agent for the epoxy resin. It includes at least one organic anion consisting of a dialkylphosphate and/or a dialkylphosphinate, wherein the alkyl group is linear or branched and independently contains from 1 to 12 carbon atoms, and at least one organic cation, forming a salt having a melting point below 100° C., or even below 25° C. Without wishing to be bound by this theory, it seems that the anion of the ionic liquid would allow the epoxide to be opened in order to trigger the polymerization leading to the epoxy matrix and would then be covalently bound in the epoxy matrix, while the cation would stabilize the composition by interacting with the thermoplastic polymer dispersed within the epoxy matrix.

The anion is advantageously selected from the group consisting of dialkylphosphate and dialkylphosphinate anions, wherein the alkyl group is linear or branched and independently contains from 2 to 8 carbon atoms.

The organic cation, for its part, is advantageously selected from the group consisting of tetraalkylphosphonium, N,N-dialkylimidazolium, N-alkylpyridinium, N-dialkylpiperidinium, N-dialkylpyrrolidinium, tetraalkylammonium, pyrazolium, N-alkylthiazolium, trialkylsulfonium, trialkyltriazolium cations and mixtures thereof. It is preferred to use ionic liquids formed by a tetraalkylphosphonium cation whose alkyl groups are advantageously linear and independently contain from 1 to 18 and preferably from 4 to 14 carbon atoms.

One or more of the above-mentioned ionic liquids may be used in the present invention. In the context of this description, the term "ionic liquid" will therefore be understood to include both a single ionic liquid and several of the above-mentioned ionic liquids. Furthermore, this ionic liquid may optionally be combined, in the implementation of the present invention, with at least one other ionic liquid selected for example from the salts formed of dicyanamide $[N(CN)_2]^-$, bis(trifluoromethylsulfonyl)imide $[NTf2]^-$, bis(trifluoromethane)sulfonimide [TFSI], alkylcarboxylate, hexafluorophosphate $[PF6]^-$, sulfonate, alkylsulfate, tetrafluoroborate $[BF_4]^-$, trifluoromethanesulfonate $[CF_3SO_3]^-$, $[C_4F_9SO_3]^-$, $[CF_3CO_2]^-$, $[(CF_3SO_2)_3C]^-$, $[(CF_3SO_2)_2N]^-$, nitrate $[NO_3]^-$, $[ClO_4]^-$, $F^-$, $Br^-$, $Cl^-$, $I^-$, $[Al_2Cl_7]^-$, chloroaluminate $[AlCl_4]^-$, $[CuCl_2]^-$, $[AuCl_4]^-$, $[ZnCl_3]^-$, $[SnCl_3]^-$ anions, and mixtures thereof.

According to a preferential embodiment, the ionic liquid is selected from the group consisting of the following salts:

IL-TMP: Trihexyl(tetradecyl)phosphonium
bis-2,4,4-(trimethylpentyl)phosphinate

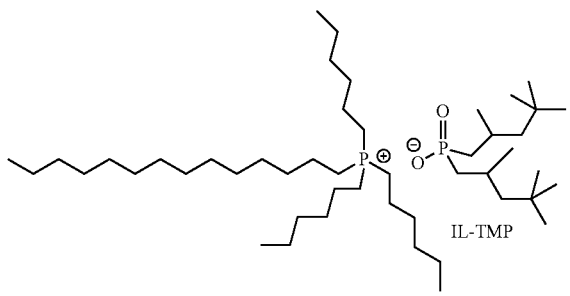 [SMILES: CCCCCCCCCCCCCC[P+](CCCCCC)(CCCCCC)CCCCCC ; CC(CC(C)(C)C)CP(=O)([O-])CC(C)CC(C)(C)C]

IL-DEP: Tributyl(ethyl)phosphonium
diethylphosphate

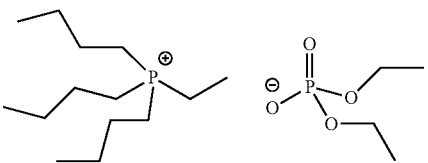

IL-DCA: Trihexyl(tetradecyl)phosphonium
dicyanamide

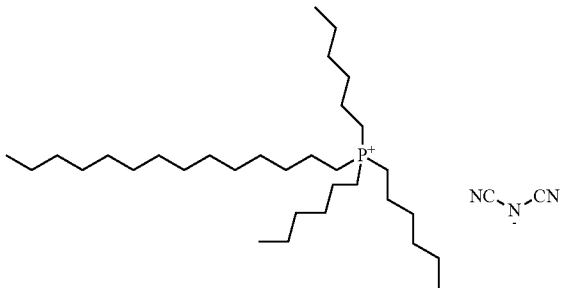 [SMILES: CCCCCCCCCCCCCC[P+](CCCCCC)(CCCCCC)CCCCCC ; N#CNC#N]

IL-EHP: Trihexyl(tetradecyl)phosphonium bis(2-ethylhexyl)phosphate

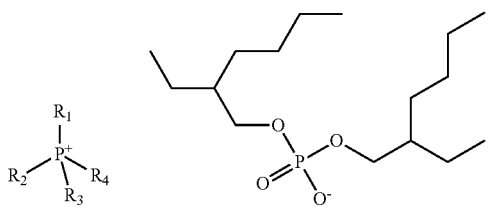

wherein $R_1$, $R_2$, $R_3$=hexyl and $R_4$=tetradecyl.

Ionic liquids of this type are notably available from the company CYTEC under the trade name Cyphos® IL 104, Cyphos® IL 169 and Cyphos® IL 105.

Advantageously, the ionic liquid is selected from the group consisting of tributyl(ethyl)phosphonium diethylphosphate (IL-DEP), trihexyl(tetradecyl)phosphonium bis-2,4,4-(trimethylpentyl)phosphinate (IL-TMP) and mixtures thereof. More preferentially, it consists of tributyl (ethyl)phosphonium diethylphosphate.

The ionic liquid may represent from 5 to 50 parts by weight per 100 parts by weight of epoxy resin.

In an advantageous embodiment, the ionic liquid is present in molar excess relative to the epoxy resin. The Applicant has indeed found that the excess ionic liquid could give the material a self-healing or self-healing character. More precisely, the excess ionic liquid would prevent the formation of cracks and/or crackles after machining of the material by triggering physicochemical mechanisms that restore the properties of the material.

According to the invention, the epoxy resin is mixed with the thermoplastic polymer under temperature and, optionally, stirring conditions and for a duration sufficient to solubilize the thermoplastic polymer in the epoxy resin, for example at a temperature comprised between 100 and 200° C., advantageously comprised between 120 and 160° C. and for a duration ranging for example from 30 minutes to two hours.

Although not generally necessary, it is possible to mix the epoxy resin and thermoplastic polymer in the presence of a solvent, which may subsequently be evaporated during the manufacturing process of the composite material described below.

The ionic liquid can be added to the epoxy resin before, simultaneously with, or after the addition of the thermoplastic polymer.

According to a preferred embodiment of the invention, the ionic liquid is introduced into the mixture consisting of the thermoplastic polymer dissolved in the epoxy resin. Thus, step a) of the process according to the invention is divided into two steps a1) and a2) as follows:
a1) said thermoplastic polymer is solubilized in said epoxy monomer and/or said epoxy prepolymer; and
a2) the cross-linking agent comprising, preferably consisting of, said ionic liquid is added to the mixture thus formed.

In this case, the ionic liquid is generally added under the same temperature conditions, or at lower temperatures, for example comprised between 80 and 160° C., and preferably under stirring.

If an elastomer is used as reinforcing polymer, it is generally mixed with the epoxy resin at a temperature comprised between 40 and 120° C., for example from 40 to 80° C., optionally with stirring or using ultrasound.

In all cases, the mixture is then shaped before it gels, using any appropriate technique known to the skilled person, notably by casting, spraying, dipping, compression, infusion, resin transfer molding (RTM), wet impregnation, stereolithography, additive manufacturing (powder deposition) or contact molding, for example.

Simultaneously with or after the shaping of the mixture, a curing step is carried out to obtain a vitrified material. This step may involve several successive temperature stages, for example a first stage at 60-90° C. for one to three hours, followed by a second stage at 100-180° C. for two to four hours. It may be followed by a post-curing step, generally at a temperature above the maximum glass transition temperature that the material can reach, for example at 180-220° C. In all cases, it is preferable that the material obtained is then cooled slowly to avoid the development of cracks.

According to need, it is possible to add one or more additives to the mixture of the epoxy resin and the reinforcing polymer, before or after adding the ionic liquid. These additives may notably be selected from: fillers, and in particular reinforcing fillers, opacifying fillers and conductive fillers, for example carbon nanotubes, carbon fibers, carbon black, glass fibers, silica, titanium or clays; flame retardants; anti-UV agents; thermal stabilizers; pigments and/or dyes; bactericidal agents; catalysts; and mixtures thereof. Alternatively or additionally, it is possible to prepare a reinforced composite material during the shaping step by coating a fibrous reinforcement of the mixture of epoxy resin, reinforcing polymer and ionic liquid.

In the end, this process produces a part or a coating that can be used, for example, in the aeronautics, aerospace, automotive (body parts, paints, etc.), maritime, wind power (blades), electronics (encapsulation of electronic components, etc.), or sports and leisure (tennis rackets, skis, bicycles, surfboards, etc.) sectors.

The invention and the advantages resulting therefrom will be more apparent from the following exemplary embodiments, which are given by way of illustration and are in no way limiting.

EXAMPLES

1/Base Compounds

Various polymeric materials are prepared from the following products:

Amine: 4,4'-methylene bis(3-chloro-2,6-diethylaniline), or MCDEA, corresponding to the compound of the following formula:

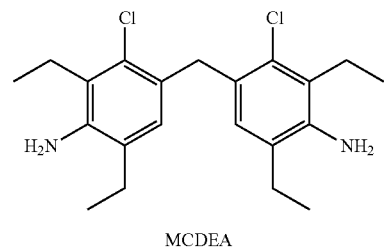 [SMILES: CCc1cc(Cc2cc(CC)c(N)c(CC)c2Cl)c(Cl)c(CC)c1N]

MCDEA provided by LONZACURE.

Epoxy resin: DGEBA DER 332 resin corresponding to the compound of the following formula:

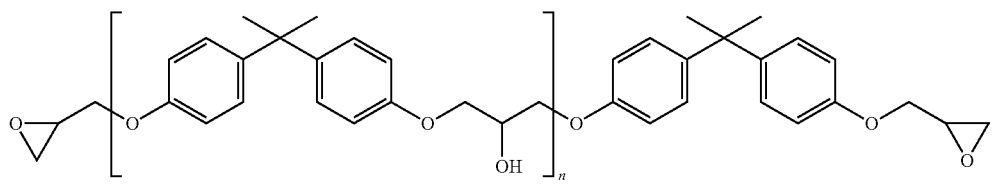

wherein n is such that the molar mass of the resin is about 350 g/mol (epoxide equivalent mass of 175 g/mol), marketed by DOW Chemical Company.

Thermoplastic Polymer:

PPO corresponds to the poly(p-phenylene oxide) of formula:

wherein n is such that the molecular weight of the resin is about 32,000 g/mol

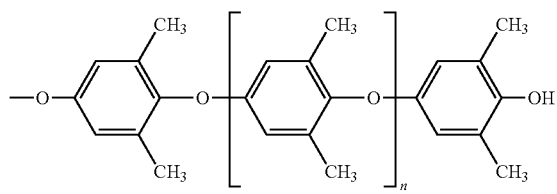

Core-Shell Particles:

Particles with a silicon core and a poly(methyl methacrylate)-based shell, marketed by WACKER Chemie AG under the trade name Genioperl® P52, hereinafter referred to as "CSR".

Ionic Liquid:

Trihexyl(tetradecyl)phosphonium bis-2,4,4-(trimethylpentyl)phosphinate (IL-TMP) corresponding to the ionic liquid of the following formula:

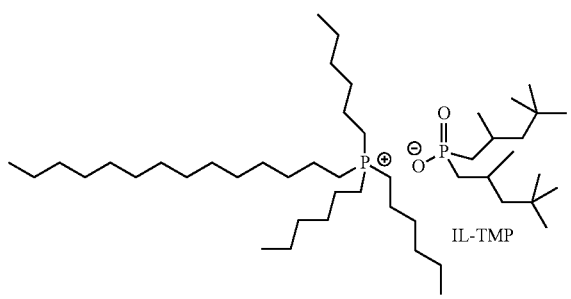 [SMILES: CCCCCCCCCCCCCC[P+](CCCCCC)(CCCCCC)CCCCCC ; CC(CC(C)(C)C)CP(=O)([O-])CC(C)CC(C)(C)C]

Tributyl(ethyl)phosphonium diethylphosphate (IL-DEP) corresponding to the ionic liquid of the following formula:

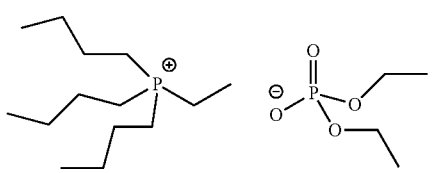

2/Formulations:

Several exemplary materials according to the invention were produced and compared to counter-examples. Table 1 summarizes these various embodiments.

TABLE 1

| Examples | Amine | Epoxy resin | Reinforcing polymer | Ionic liquid |
|---|---|---|---|---|
| CE-1 | MCDEA | DGEBA | PPO | — |
| CE-2 | MCDEA | DGEBA | PPE-g-MA | — |
| CE-3 | MCDEA | DGEBA | CSR | — |
| CE-4 | MCDEA | DGEBA | — | — |
| CE-5 | — | DGEBA | — | IL-TMP |
| INV-1 | — | DGEBA | PPO | IL-TMP |
| INV-2 | — | DGEBA | PPE-g-MA | IL-TMP |
| INV-3 | — | DGEBA | PPO | IL-DEP |
| INV-4 | — | DGEBA | PPE-g-MA | IL-DEP |
| INV-5 | — | DGEBA | CSR | IL-TMP |

3/Manufacturing

To prepare the epoxy resin/thermoplastic polymer mixtures, the DGEBA epoxy prepolymer was heated to 150° C. or 130° C., then mixed with poly(phenylene oxide) (PPO) or with poly(phenylene oxide) grafted with maleic anhydride (PPO-g-MA), respectively, for one hour, to obtain a miscible mixture. The cross-linking agent (MCDEA in a stoichiometric ratio or IL-TMP at 10 phr or IL-DEP at 10 phr) was then added and mechanically mixed for a few minutes before the mixture was poured into silicone molds. The molds were heated to 90° C. for about 2 hours. The curing protocol included a stage at 80° C. for 2 hours, then at 120° C. for 3 hours for the IL-TMP-cured networks, a stage at 80° C. for 2 hours then at 160° C. for 3 hours for the IL-DEP-cured networks and a stage at 150° C. for 1 hour then at 180° C. for 2 hours for the MCDEA-cured networks. A post-curing step at 200° C. was also applied to the three networks obtained in order to complete the cross-linking reaction (1 hour for those cured with MCDEA and IL-TMP and 3 hours for those cured with IL-DEP).

To prepare the samples based on epoxy resin and elastomer, the core-shell particles were dispersed in the DGEBA resin at 60° C. for one hour, with a stirring speed of 200 rpm. The mixture was then subjected to ultrasound (60 mW) for 15 minutes to fully disperse the particles in the resin. A stoichiometric ratio of MCDEA and 10 phr of IL-TMP were then added and the whole was mixed to obtain a homogeneous mixture which was poured into silicone molds and cured in an oven. The curing protocol included a stage at 150° C. for 1 hour, then at 180° C. for 2 hours for the MCDEA-cured networks and a stage at 80° C. for 2 hours then at 120° C. for 3 hours for the IL-TMP-cured networks. A post-curing step at 200° C. for 1 hour was also applied to the two networks obtained to complete the cross-linking reaction.

4/Thermal Stability

The degradation temperatures of each of the samples were measured by thermogravimetric analysis (TGA), using a Q500 thermogravimetric analyzer (TA Instruments) with a temperature rise from 30 to 700° C. and a heating rate of 20 K·min$^{-1}$ under nitrogen.

The results are presented in Table 2:

TABLE 2

| Examples | $T_{d5\%}$ (° C.) | $T_{d10\%}$ (° C.) | $T_{dmax}$ (° C.) |
|---|---|---|---|
| CE-1 | 390 | 399 | 418 |
| CE-2 | 392 | 400 | 418 |
| INV-1 | 404 | 422 | 457 |
| INV-2 | 405 | 420 | 450 |
| CE-3 | 383 | 396 | 418 |
| INV-5 | 412 | 428 | 453 |

$T_{d5\%}$ (° C.) is the temperature at which the sample is observed to lose 5% of its mass relative to its initial mass. $T_{d10\%}$ (° C.) is the temperature at which the sample is observed to lose 10% of its mass relative to its initial mass. $T_{dmax}$ (° C.) is the temperature at which the sample is observed to lose a maximum of its mass relative to its initial mass.

The results in the table show that replacing an amine with an ionic liquid as cross-linking agent in the samples significantly improves the thermal stability.

Indeed, for samples INV-1 and INV-2, the results clearly show a higher thermal stability compared with samples CE-1 and CE-2. The same is true for sample INV-5 compared with the control CE-3. The degradation temperature is improved by at least 30° C., indeed by about 40° C.

5/Fire Retardancy

The samples of materials according to the invention and of comparative materials were heated to a temperature of 700° C. under nitrogen. The mass percentage of each sample was then measured, after degradation, based on the total mass of the sample before degradation, referred to in the table below as "residue".

The results obtained are summarized in Table 3:

TABLE 3

| Examples | Residue (%) |
|---|---|
| CE-1 | 9.9 |
| CE-2 | 11.2 |
| INV-1 | 12.6 |
| INV-2 | 12.6 |
| INV-3 | 21.4 |
| INV-4 | 20.2 |

These results show that the residue is slightly higher in the presence of the ionic liquid as cross-linking agent, which reflects a better fire retardancy of the materials according to the invention.

6/Water and Solvent Barrier Properties

The results are presented in Table 4:

TABLE 4

| Examples | $\Theta_{water}$ (°) | $\Theta_{CH2I2}$ (°) | $\gamma_{non\text{-}dispersive}$ (mJ/m²) | $\gamma_{dispersive}$ (mJ/m²) | $\gamma_{total}$ (mJ/m²) |
|---|---|---|---|---|---|
| CE-1 | 89 | 52 | 1.5 | 31.0 | 32.5 |
| CE-2 | 90 | 51 | 1.1 | 32.5 | 33.6 |
| INV-1 | 101 | 79 | 1.6 | 16.4 | 18.0 |
| INV-2 | 105 | 71 | 0.2 | 22.3 | 22.5 |
| INV-3 | 99 | 73 | 1.3 | 19.6 | 20.9 |
| INV-4 | 100 | 71 | 1.0 | 21.2 | 22.2 |
| CE-3 | 80 | 48 | 4.5 | 31.1 | 35.6 |
| INV-5 | 101 | 70 | 0.5 | 22.4 | 22.9 |

CH2I2: diiodomethane
$\Theta$: contact angle expressed in degrees (°).

The quantities $\Theta_{water}$ and $\Theta_{CH2I2}$ represent, respectively:
the value of the contact angle of a water droplet on samples CE-1, CE-2 and INV-1 to INV-4.
the value of the contact angle of a $CH_2I_2$ droplet on samples CE-1, CE-2 and INV-1 to INV-4.

The quantities $\gamma_{non\text{-}dispersive}$, $\gamma_{dispersive}$ and $\gamma_{total}$ represent, respectively:
the surface tension of the non-dispersive phase, i.e. the polar phase;
the surface tension of the dispersive phase, i.e. the non-polar phase;
the sum of the surface tensions of the dispersive and non-dispersive phases.

Surface tensions were obtained by the hanging drop method, using a DataPhysics goniometer and by depositing droplets of water and of diiodomethane on the test material. The non-dispersive and dispersive components of surface energy were calculated using the Owens-Wendt theory.

The results in Table 4 show that the samples according to the invention, INV-1 to INV-4, have a contact angle value substantially higher than that of samples CE-1 and CE-2, representative of the state of the art. An increase of about 10° for water and between 20 and 30° for diiodomethane is observed. Similarly, sample INV-5 shows a 20° contact angle improvement for water and diiodomethane, compared with the control (CE-3).

Samples INV-1 to INV-4 also have lower total surface energy values than those of samples CE-1 and CE-2, thus proving their better hydrophobic properties and therefore their lower permeability to fluids, notably water and organic solvents. The same is true for sample INV-5 compared with the control CE-3.

7/Mechanical Strength

Mechanical strength properties were measured by evaluating the fracture toughness ($K_{IC}$) of compact specimens of materials according to the invention and of comparative materials, in accordance with ISO 13586. The fracture toughness test was performed using an MTS load frame in tensile mode at a speed of 10 mm·min⁻¹. Fracture toughness was calculated using the following equation:

$$K_{Ic} = f(a/w) \frac{F_Q}{h\sqrt{w}}$$

where $F_Q$(N) is the load applied at the beginning of crack propagation, a(m) is crack length, w(m) is specimen width, h(m) is specimen thickness and f(a/w) is the calibration factor related to the geometry of the specimen:

$$f(a/w) = \frac{(2+a)}{(1-a)^{3/2}}(0.886 + 4.64a - 13.32a^2 + 14.72a^3 - 5.6a^4)$$

The quantity $K_{IC}$ is expressed in MPa·m^{1/2} and is measured for each of the samples.

The results are presented in Table 5:

TABLE 5

| Examples | $K_{IC}$ (MPa · m^{1/2}°) |
|---|---|
| CE-1 | 0.69 ± 0.02 |
| CE-2 | 0.64 ± 0.03 |

TABLE 5-continued

| Examples | $K_{IC}$ (MPa·m$^{1/2°}$) |
|---|---|
| INV-3 | 1.67 ± 0.11 |
| INV-4 | 1.56 ± 0.04 |

The materials according to the invention, INV-3 and INV-4, have a better mechanical strength compared with the counter-examples (CE-1 and CE-2), which results in a 140% increase in the fracture toughness of the material.

8/Thermomechanical Properties

The thermomechanical properties of sample INV-5 were measured using a Rheometrics RSAII solids analyzer at 0.05% tensile stress, with a frequency of 1 Hz and a heating rate of 3 K/min, over a temperature range from −130° C. to 200° C.

The relaxation temperatures obtained are presented in Table 6 below.

TABLE 6

| Sample | CSR (phr) | Cross-linker | Tα core (° C.) | Tα matrix (° C.) |
|---|---|---|---|---|
| CE-3 | 10 | MCDEA | −119 | 172 |
| CE-4 | 0 | MCDEA | — | 178 |
| CE-5 | 0 | IL-TMP | — | 150 |
| INV-5 | 10 | IL-TMP | −116 | 149 |

From this table, two relaxation peaks can be observed, the first of which corresponds to the silicone core and the second of which corresponds to the epoxy matrix and merges with the relaxation peak of the PMMA shell. The addition of core-shell particles does not significantly alter the relaxation temperature of the epoxy matrix, regardless of the cross-linking agent used.

The invention claimed is:

1. A composite material comprising an epoxy matrix and a reinforcing polymer dispersed therein;
   wherein the reinforcing polymer is selected from the group consisting of thermoplastic polymer particles, elastomer particles, core-shell particles, and combinations thereof; and
   wherein the epoxy matrix is an epoxy resin cross-linked by an ionic liquid cross-linking agent which consists of at least one dialkylphosphate salt of an organic cation or a mixture of said at least one dialkylphosphate salt of an organic cation and a dialkylphosphinate salt of an organic cation, wherein the alkyl groups of the salts are linear or branched and independently contain from 1 to 12 carbon atoms.

2. The composite material according to claim 1, wherein the reinforcing polymer contains thermoplastic polymer particles.

3. The composite material according to claim 1, wherein the reinforcing polymer contains core-shell particles whose core comprises or consists of an elastomer and whose shell comprises or consists of a thermoplastic polymer.

4. The composite material according to claim 3, which is obtained by a process comprising the following steps:
   a) mixing: (i) the epoxy resin, (ii) a block copolymer capable of forming the core-shell structure after solubilization in the epoxy resin and (iii) the ionic liquid cross-linking agent; and
   b) shaping and curing the mixture thus obtained.

5. The composite material according to claim 1, wherein the reinforcing polymer contains elastomer nanoparticles.

6. The composite material according to claim 1, which is obtained by a process comprising the following steps:
   a) mixing: (i) the reinforcing polymer, (ii) the epoxy resin and (iii) the ionic liquid cross-linking agent; and
   (b) shaping and curing the mixture thus obtained.

7. The composite material according to claim 1, wherein the epoxy resin is diglycidyl ether of bisphenol A (DGEBA).

8. The composite material according to claim 1, wherein the thermoplastic polymer particles are selected from the group consisting of poly(ether sulfones), polyethylenimines, polyamides, polyamide-imides, poly(phenylene oxides) optionally grafted with methacrylate (PPO-g-MA) and mixtures thereof.

9. The composite material according to claim 1, wherein the organic cation is selected from the group consisting of tetraalkylphosphonium, N,N-dialkylimidazolium, N-alkylpyridinium, N-dialkylpiperidinium, N-dialkylpyrrolidinium, tetraalkylammonium, pyrazolium, N-alkylthiazolium, trialkylsulfonium, trialkyltriazolium cations, and mixtures thereof.

10. The composite material according to claim 1, wherein the alkyl groups of the salts are linear or branched and independently contain from 2 to 8 carbon atoms.

11. The composite material according to claim 1, wherein the ionic liquid cross-linking agent consists of tributyl(ethyl) phosphonium diethylphosphate (IL-DEP) or a mixture IL-DEP and trihexyl(tetradecyl)phosphonium bis-2,4,4-(trimethylpentyl)phosphinate (IL-TMP).

12. The composite material according to claim 1, wherein the ionic liquid cross-linking agent consists of at least two dialkylphosphate salts of organic cations, wherein the alkyl groups of the salts are linear or branched and independently contain from 1 to 12 carbon atoms.

13. An item comprising the composite material according to claim 1, wherein the item is in the form of a part or a coating, which is useful in the sectors of aeronautics, aerospace, automotive, maritime, wind power, electronics, or sports and leisure.

14. A process for manufacturing a composite material comprising the following steps:
   a) mixing (i) a reinforcing polymer selected from the group consisting of thermoplastic polymer particles, elastomer particles, core-shell particles, and combinations thereof, (ii) an epoxy resin and (iii) an ionic liquid cross-linking agent which consists of at least one dialkylphosphate salt of an organic cation or a mixture of said at least one dialkylphosphate salt of an organic cation and a dialkylphosphinate salt of an organic cation, wherein the alkyl groups of the salts are linear or branched and independently contain from 1 to 12 carbon atoms; and
   (b) shaping and curing the mixture thus obtained.

* * * * *